United States Patent [19]

Maccabee et al.

[11] 3,965,355

[45] June 22, 1976

[54] LOW POWER INFRARED LASER INTRUSION SYSTEMS

[76] Inventors: Bruce S. Maccabee, 10706 Meadowhill Road, Silver Spring, Md. 20901; Charles E. Bell, 9717 Delamere Court, Potomac, Md. 20854

[22] Filed: Oct. 23, 1974

[21] Appl. No.: 517,160

[52] U.S. Cl. .................................. 250/341; 250/338

[51] Int. Cl.$^2$ .......................................... G01J 1/00

[58] Field of Search ........... 250/338, 339, 340, 341; 340/258 B

[56] References Cited

UNITED STATES PATENTS

| | | | |
|---|---|---|---|
| 3,704,461 | 11/1972 | Rose et al. | 340/258 B |
| 3,711,846 | 1/1973 | Schlisser et al. | 340/258 B |
| 3,816,745 | 6/1974 | Primm et al. | 340/258 B X |
| 3,825,916 | 7/1974 | Steele et al. | 340/258 B |
| 3,863,070 | 1/1975 | Wheeler et al. | 250/339 |

*Primary Examiner*—Archie R. Borchelt

[57] ABSTRACT

A laser intrusion system incorporating a relatively long wavelength infra-red laser, a beam path, a quantum amplifier, a detector, and associated optical and electronic components is described. The relatively long wavelength of the laser radiation and the high gain and narrow bandwidth of the quantum amplifier make the system relatively immune to environmental conditions such as fog and rain and particularly applicable for long range, all-weather, outdoor use.

8 Claims, 2 Drawing Figures

FIG. 1
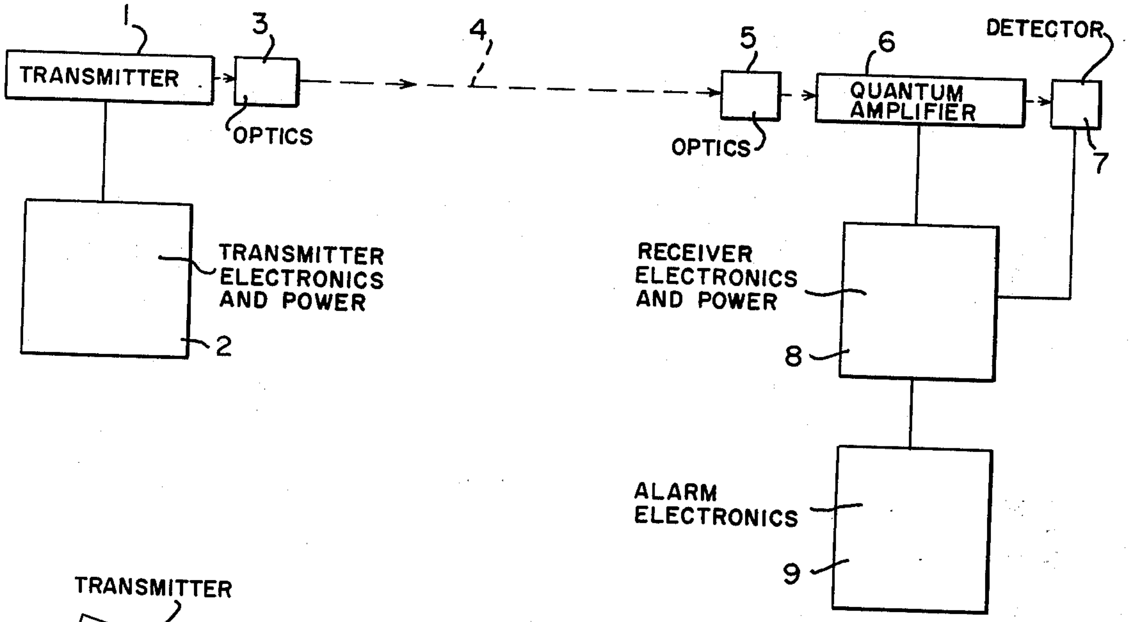
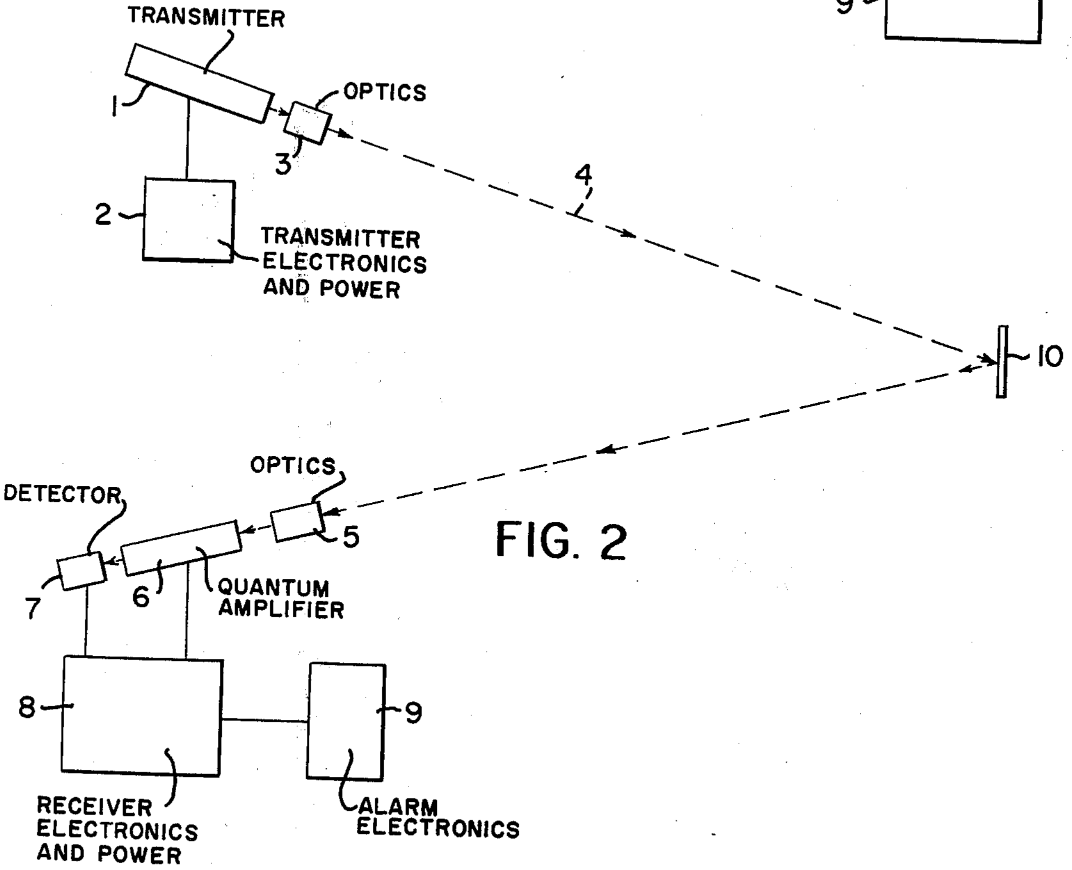
FIG. 2

LOW POWER INFRARED LASER INTRUSION SYSTEMS

This invention relates to optical intrusion devices of the beam breaking nature, and, more particularly, to such devices as those which incorporate a laser as the source of radiation, and, most particularly, to such devices as those which use lasers that generate infra-red radiation to take advantage of the covert nature of the invisible beam and of the small beam divergence of the laser radiation. For the purposes of this invention the term "infra-red" (abbrev.: IR) shall refer to electromagnetic radiation of wavelengths longer than 0.7 microns, and the term "relatively long wavelength IR" shall refer to radiation of wavelengths longer than one micron.

Previous IR laser intrusion systems have utilized radiation of wavelengths smaller than one micron and have detected the presence of this radiation with thermal or quantum detectors, which are devices that produce an electronic signal level that is a monotonic, and very nearly proportional, function of the intensity of the radiation incident on the detector. This detection has been accomplished with no amplification of the IR radiation before detection. Relative immunity to extraneous radiation has been achieved by using spatial and optical frequency filters "in front of" the detector, and by modulation of the transmitted laser beam (coding of the beam) so that it can be electronically distinguished from non-similarly modulated radiation. Such previous systems have had limited utility in all-weather, environmental applications. The system to be described offers greater immunity to extraneous sources of radiation and more reliable operation under extreme environmental conditions.

It is well known that the longer the wavelength of the radiation, the less it is attenuated by passage through the atmosphere. It is, therefore, advantageous to increase the wavelength of the radiation that is used in the intrusion system. In a beam-breaking intrusion system, which fundamentally comprises a source (transmitter) of IR radiation, a beam path through the region in which the intrusion is to be detected, a receiver of the radiation, and appropriate intrusion signalling electronics, attenuation of the radiation as it passes through the atmosphere along the beam path is the limiting factor in operation of the system during periods of extreme environmental conditions such as rain and fog. This limitation arises because the intrusion signalling electronics is activated whenever the transmitted radiation that reaches the detector has dropped to such a low level that the electronics cannot distinguish that portion of the electrical output of the detector which indicates the presence of IR radiation from that portion of the electrical output of the detector which is generated by spontaneous fluctuations of electrons (i.e., "noise"). It is well known that the loss of radiation due to attenuation of the atmosphere along the beam path can be compensated for, either partially or totally, by either an increase in the intensity (power) of the transmitted beam or by an increased sensitivity (reduced noise) of the detector. Electrically powered laser radiation sources are quite inefficient, so considerable increases in the transmitted IR radiation power (i.e., increases of several orders of magnitude) require very great increases in the electrical power needed to operate the laser. On the other hand, considerable increases in the sensitivity of the detector (i.e., considerable reduction in the self-generated noise) may not require large increases in the electrical power input, depending upon what method is used to effect the increase in sensitivity. However, increases in the sensitivity of the detector may make the system less immune to extraneous radiation. Such extraneous radiation can "saturate" a sensitive detector and make it less able to detect the desired (transmitted IR beam) radiation. The intensity of the extraneous radiation which reaches the detector can be reduced by making use of spatial and optical frequency filters. Spatial filters can reduce the extraneous radiation considerably, but there must always be some angle of radiation acceptance in order to receive radiation from the transmitter, so the spatial filters will not reduce the extraneous radiation to zero. Optical frequency filters can be used to allow only a small band of frequencies to reach the detector, namely, those which are centered around the frequency of the transmitter. Such filters, typically those known as "interference filters," have very narrow bandpasses (0.01 micron or so) and will reduce extraneous radiation outside the bandpass to virtually zero. However, a consequence of the narrowness of their bandpass may be that they also reduce the intensity of the desired radiation that reaches the detector. Nevertheless, the use of such spatial and frequency filters can make an increase in sensitivity of the detector a viable alternative to an increase in transmitter power. One way to increase the sensitivity (i.e., lower the Noise Equivalent Power, NEP) of the detector is to cool it to very low temperatures, thus lowering the level of spontaneous noise generated by electrons within the detector. Unfortunately, such cooling, if done with liquified gasses, would require repeated replacement of the coolant since the liquified gasses would evaporate quite rapidly, and, if done by electrical means, as with thermoelectric coolers, would require considerable expenditures of electrical power. Thus, increasing the sensitivity of the IR radiation receiver by cooling the detector may not be practical in an intrusion system. One objective of this invention is to increase the sensitivity of the IR receiver in an intrusion system without requiring that the detector be cooled.

The main objective of this invention is to provide an intrusion system which, when compared to previous systems, is relatively immune to environmental conditions without the need for very large IR radiation transmitter powers. Another objective of this invention is to incorporate into an intrusion system a receiver subsystem, comprising a pre-detection radiation amplifier and detector, which is relatively immune to extraneous radiation. Still another objective of this invention is to incorporate into an intrusion system a sensitive receiver subsystem that does not require that the detector part of the subsystem be cooled. These objectives have been accomplished by the novelties in this invention. The major novelty of this invention is the inclusion of a quantum amplifier operating at the frequency of the laser transmitter for pre-detection amplification of the relatively long wavelength IR that traverses the beam path. The presence of the quantum amplifier increases the sensitivity of the receiver subsystem to the extent that with uncooled detectors, such as thermopiles and pyroelectric detectors, the sensitivity approaches that of a receiver subsystem that comprises only a cooled quantum detector with no pre-detection amplifier. The quantum amplifier also acts as an extremely narrow bandpass filer (0.00001 micron or so), and, depending upon its physical construction, as a high resolution spatial filter. Another novelty of this invention is the use of relatively long wavelength IR which is less attenuated by the environment than is the IR radiation of previous systems.

FIG. 1 illustrates an intrusion system in which the optical path is a straight line path from the transmitter to the receiver.

FIG. 2 illustrates an alternative embodiment in which reflector means are in the transmitter-receiver optical path.

Referring to FIG. 1, we see the basic system of this invention. The transmitter, 1, is a relatively long wavelength IR laser that is powered by the electronics, 2. The laser radiation is focused by the transmitter optics, 3, and passes along an optical path where the intrusion is to be detected, 4, to the receiver, which comprises the radiation collection optics, 5, the quantum amplifier, 6, the detector, 7, and the receiver electronics, 8. The output of the receiver is fed into the alarm system electronics, 9, for processing and operation of the intrusion system alarms, etc. The optical path may be a straight path from the transmitter optics to the receiver optics, or it may include various reflectors, etc., to deviate the beam through one or more angles. A typical system utilizing a reflector, 10, is illustrated in FIG. 2. The purpose of the beam deviating means is to make the transmitted beam traverse an optical path other than a simple line-of-sight path. For example, such means could be used to return the transmitted beam to the vicinity of its point of origin. A system as in FIG. 2 could be used whenever it is convenient or necessary to have the IR transmitter and receiver subsystem at the same location. Such reflectors, etc., are merely incidental to the operation of this invention. The transmitter and receiver optics plus the beam deviating means, if any, provide at least one optical path from the transmitter to the receiver. However, the optics and the beam deviating means could also be arranged to provide several optical paths from the transmitter to the receiver.

The transmitter is a laser which is, typically, an electrically or optically energized substance which is contained between reflectors that allow radiation of certain optical frequencies to be reflected many times through the energized substance. The quantum amplifier is, typically, an electrically or optically energized substance which is not contained between reflectors. In order for the quantum amplifier to amplify the radiation generated by the laser, it is necessary that the energized substances of the laser and quantum amplifier be the same. In the system shown in FIG. 1, the laser and quantum amplifier are illustrated as being at different physical places. However, it is possible for the two to be in close proximity as in FIG. 2.

Other more different or more complicated arrangements of the system components than the one shown in the figure are possible, but they would still fall within the scope of this invention providing that the radiation which traverses the optical path where the intrusion is to be detected passes through the quantum amplifier before detection.

What we claim is:

1. A system which can signal the presence, within a chosen optical path, of an object that is opaque to infrared radiation and which comprises:

a. a radiation generator which produces a beam of infrared radiation,
b. beam forming optical means,
c. radiation collecting and focusing optical means,
d. a quantum amplifier that operates at the same frequency as the infrared radiation generator,
e. an infrared radiation detector which converts an infrared radiation level to an electronic signal level, and
f. electronic means which are capable of signalling a human operator in response to input signal levels from an infrared radiation detector, and in which the radiation from the generator passes through the beam forming optical means, traverses the chosen optical path whenever there is no opaque object within the said path, passes through the radiation collecting and focusing optical means and into the quantum amplifier, traverses the quantum amplifier and is incident on the infrared detector, and in which the electronic means is so connected to the infrared detector and so interconnected within itself that it signals a human operator whenever the signal level from the infrared detector falls below a certain chosen level.

2. A system as in claim 1 in which the electronic means is so connected to the infrared detector and so interconnected within itself that it signals a human operator whenever the signal level from the infrared detector rises above a certain chosen level.

3. A system as in claim 1 in which the infrared generator is a laser.

4. A system as in claim 1 in which the optical path is a straight line of sight path.

5. A system as in claim 1 in which the optical path contains a reflector means that returns the radiation from the generator to the vicinity of the generator, and in which the radiation generator, quantum amplifier, the associated optical means, and the infrared detector, as set forth in claim 1, are in close proximity.

6. A system as in claim 1 in which the infrared radiation is of a wavelength longer than 1 micron.

7. A system as in claim 1 in which the infrared radiation generator is a helium-neon laser operating at 3.39 microns and the quantum amplifier is a straight gas discharge tube containing a mixture of helium and neon gases.

8. A system as in claim 1 in which the infrared generator is a xenon laser operating at 3.5 microns and the quantum amplifier is a straight gas discharge tube containing a mixture of xenon and helium gases.

* * * * *